Figure 1:
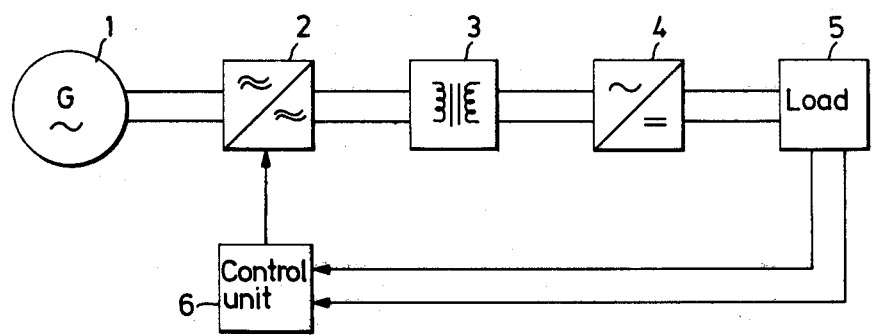

United States Patent [19]

Hedberg

[11] 4,117,303
[45] Sep. 26, 1978

[54] ARRANGEMENT IN ELECTRICAL WELDING APPARATUS

[75] Inventor: John Bengt Göran Hedberg, Gothenburg, Sweden

[73] Assignee: AB Svetsia, Askim, Sweden

[21] Appl. No.: 790,978

[22] Filed: Apr. 26, 1977

[30] Foreign Application Priority Data

Apr. 28, 1976 [GB] United Kingdom ............... 17214/76
Apr. 14, 1977 [GB] United Kingdom ............... 17214/76

[51] Int. Cl.² .............................................. B23K 9/10
[52] U.S. Cl. ............................. 219/130.1; 219/130.21
[58] Field of Search ........... 219/131 R, 131 WR, 135, 219/130.1

[56] References Cited

U.S. PATENT DOCUMENTS 3,308,265  3/1967  Hobart ............................ 219/131 R
3,316,318  4/1967  Gibson ........................... 219/131 R
3,728,516  4/1973  Daspit ............................ 219/131 R

FOREIGN PATENT DOCUMENTS 2,325,793  12/1974  Fed. Rep. of Germany ...... 219/131 R Primary Examiner—J. V. Truhe
Assistant Examiner—Clifford C. Shaw
Attorney, Agent, or Firm—Fleit & Jacobson

[57] ABSTRACT

An a.c. operated arc welding apparatus comprises a controlled frequency converter which substantially increases the frequency of the alternating current and the output of which is connected to the welding electrodes via a transformer and a rectifier. The connection between the rectifier and the welding electrodes includes a shunt capacitance having an impedance low enough to attenuate the alternating current components of the welding current to a level acceptable from the acoustic aspect, the said connection further comprising means for preventing the capacitor from adversely affecting the rectifier and frequency converter and also comprising a choke arranged between the capacitor and the electrodes to prevent the capacitor from adversely affecting the welding properties.

5 Claims, 2 Drawing Figures

U.S. Patent    Sept. 26, 1978    4,117,303

ARRANGEMENT IN ELECTRICAL WELDING APPARATUS

The present invention relates to arc welding apparatus of the kind in which the welding electrodes are supplied with pulsating direct current derived from an a.c. supply by means of a controlled frequency converter which substantially increases the frequency of the alternating current, and which is connected to the welding electrodes through a transformer and a rectifier.

Such apparatus has the advantages of low weight, easy control of the welding parameters, low manufacturing costs and high efficiency. A serious disadvantage with such apparatus, however, is that, as a result of the transformation of the alternating current to a higher frequency, e.g. 500 – 1500 Hz or even higher, e.g. up to 15,000 Hz, in the frequency converter, the pulsating d.c. current fed to the welding electrodes during welding gives rise to sound oscillations of such intensity as to exceed normally acceptable sound levels, e.g. 85 dBA at frequencies up to 16,000 Hz, 95 dB in the frequency range of 16,000 to 20,000 Hz and 105 dB in the frequency range of 20,000 to 50,000 Hz. Hitherto this has prevented such apparatus from being used in practice.

An object of the present invention is to provide such apparatus in which the aforementioned disadvantages are substantially eliminated whilst retaining the advantages afforded by such apparatus.

To this end it is proposed in accordance with the invention that the connection between the rectifier and the welding electrodes should include a shunt capacitor having an impedance low enough to attenuate the alternating current components of the welding current to a level acceptable from the acoustic aspect, the said connection further comprising means for preventing the capacitor from adversely affecting the rectifier and frequency converter and also comprising a choke arranged between the capacitor and the electrodes to prevent the capacitor from adversely affecting the welding properties.

Preferably said means for preventing the capacitor from adversely affecting the rectifier and frequency converter has the form of a further choke arranged upstream the capacitor, preferably between the rectifier and the capacitor.

Figure 2:
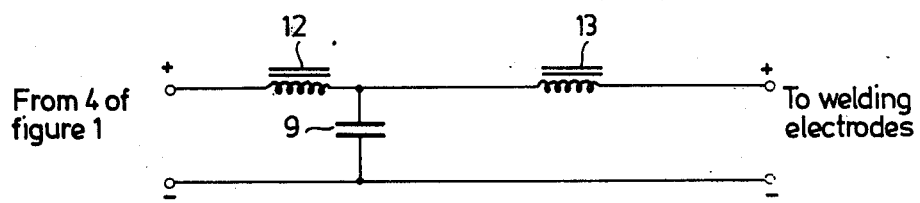

So that the invention will be more readily understood and further features thereof made apparent, an examplary embodiment of the invention will now be described with reference to the accompanying drawing, in which FIG. 1 is a block schematic circuit diagram showing the principal component of welding apparatus supplied by alternating current; and FIG. 2 is a circuit diagram showing the additional components to be included in the apparatus of FIG. 1 in accordance with a preferred embodiment of the invention.

In FIG. 1 there is shown an arc welding apparatus comprising an a.c. generator 1, e.g. an a.c. mains supply (250/380 V, 50 Hz), a frequency converter 2, a transformer 3, and a rectifier 4, connected in cascade so as to supply direct current to a load 5 which is in the form of a welding arc.

The output frequency of the converter 2 is controlled, and the converter may comprise a rectifier connected in series with an a.c. inverter circuit of the series capacitor type, the conductivity of the current control devices of the inverter being controlled with the aid of pulses obtained from a control unit 6 which operates in dependence upon the current through, and the voltage across, the load 5. To this end the control unit 6 may comprise an oscillator which delivers control pulses alternately to the current control devices of the inverter at a suitable timing to obtain the desired welding current. This current comprises a pulsating current of relatively high frequency, e.g. in the order of magnitude of 1000 – 3000 Hz or even higher, e.g. up to 30,000 Hz, and would, if no other measures were taken, give rise to harmful high frequency noise, such as noise in a range of about 95 dBA with a welding current of 250A.

As will be seen from FIG. 2 there is provided, for the purpose of preventing disturbing noise during a welding operation, a capacitor 9 which is permanently connected across the line leading to the welding electrodes, said capacitor preferably being of the order of magnitude of at least 1000 $\mu$F in the case of an apparatus having an output capacity of 375A.

When the welding apparatus is to be used in different welding current ranges, conveniently a capacitor 9 of variable capacitance is used to enable said capacitance to be modified in respect of the particular field of use, and in order that the level of sound is lowered, the capacitor shall be so constructed and so connected in the circuit that the parallel arm containing the capacitor shall have as low an a.c. impedance as possible, which means that the resistance and inductance of the parallel arm shall be very small. The connection of the capacitor 9 alone would, however, make it impossible to effect a welding operation, owing to the fact that the capacitor would be discharged momentarily with each short circuit in the weld zone, for example through droplets of welding material during an arc welding operation, due to which the arc welding would be extinguished during the time required to recharge the relatively large capacitor. Further, the capacitor would act to present a short-circuit to the frequency converter and therewith cause high current peaks, which would disturb the operation of the frequency converter and, moreover, act adversely on the components arranged upstream of the capacitor. To eliminate these disadvantages, the apparatus is provided with means for preventing such current peaks. Said means may be constructed and arranged in many different ways upstream of the capacitor and may, for example, be of the resistive type. It is preferred, however, that said means has the form of a choke, such as that shown at 12 in FIG. 2, the choke being placed immediately upstream of the capacitor 9. Further, there is arranged between the capacitor 9 and the electrodes a further choke 13 having an inductance of sufficient magnitude to support the arc during the recharge of the capacitor subsequent to a short circuit caused through droplets of welding material. The inductances of chokes 12 and 13 are selected in dependence upon, inter alia, the capacitance of the capacitor 9 and the internal capacity of the apparatus and, with the aforedisclosed values of the capacitor, and the output capacity of the welding apparatus, both may suitably be of the order of magnitude of 50 $\mu$H.

I claim:

1. Welding apparatus of the type wherein the welding electrodes for producing an arc are supplied with pulsating direct current derived from an a.c. current supply by means of a controlled frequency converter which substantially increases the frequency of the alternating current, the output of said converter being connected through a transformer and a rectifier to the welding electrodes, wherein the connection between the rectifier and the welding electrodes includes a shunt capacitance having a preselected impedance which is of a low value so as to attenuate the alternating current components of the welding current to an audio level of at most 85 dB at frequencies up to 16,000 Hz, 95 dB in the frequency range of 16,000 to 20,000 Hz and 105 dB in the frequency range of 20,000 to 50,000 Hz, the said connection further comprising means for preventing the capacitor from adversely affecting the rectifier and frequency converter and a choke arranged between the capacitor and the electrodes to support the arc during recharge of the capacitor but for allowing discharge thereof during short circuit periods caused by droplets of molten welding material.

2. Apparatus as claimed in claim 1, wherein said means for preventing the capacitor from adversely affecting the rectifier and frequency converter has the form of a further choke arranged upstream the capacitor.

3. Apparatus as claimed in claim 2, wherein said further choke is arranged between the rectifier and the capacitor.

4. Apparatus as claimed in claim 2, wherein the inductance of said choke and of said further choke is about 50 $\mu$H.

5. Apparatus as claimed in claim 1, wherein the capacitance of said capacitor is at least about 1000 $\mu$F.